Patented Jan. 31, 1939

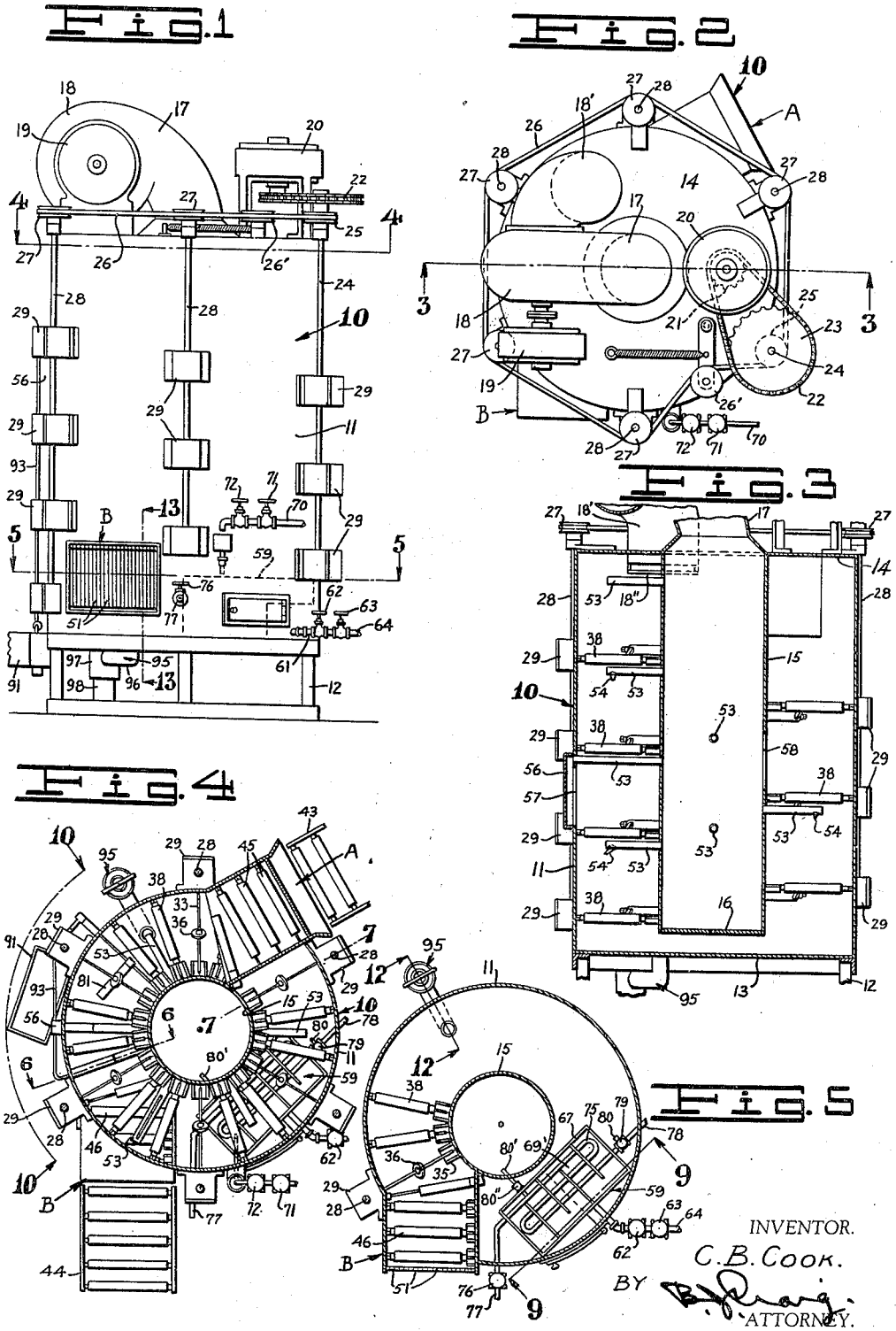
Jan. 31, 1939. C. B. COOK 2,145,475
BOX AND FRUIT TREATING APPARATUS
Filed Dec. 28, 1935 2 Sheets-Sheet 1
INVENTOR.
C. B. Cook.
BY
ATTORNEY.

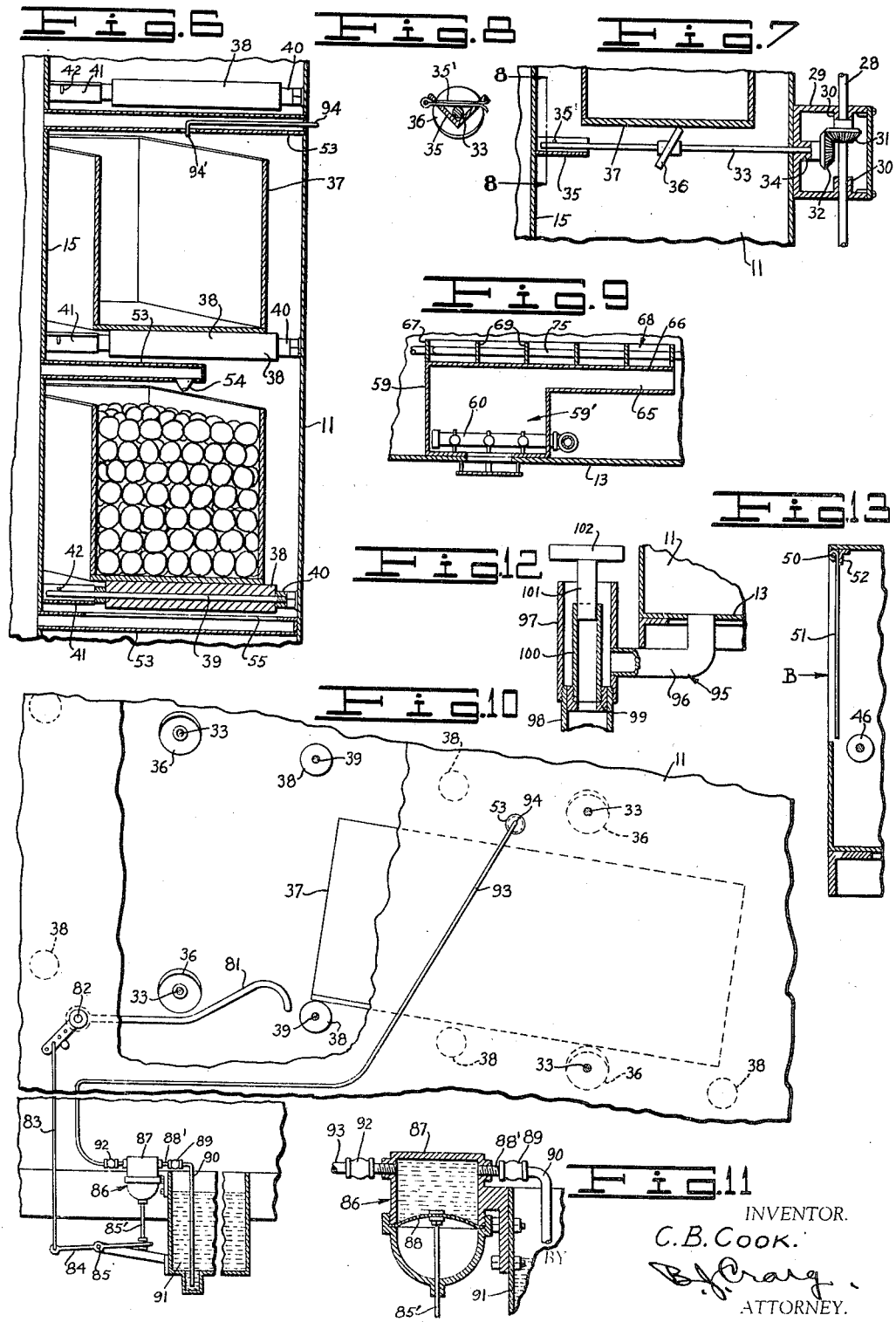

2,145,475

UNITED STATES PATENT OFFICE 2,145,475

BOX AND FRUIT TREATING APPARATUS

Charles B. Cook, Los Angeles, Calif.

Application December 28, 1935, Serial No. 56,519

10 Claims. (Cl. 21—80)

This invention relates to box and fruit treating apparatus.

The general object of the invention is to provide an improved apparatus which is particularly adapted for use in treating citrus field boxes, either when empty or when filled with fruit, in such a manner that mealy bugs or any other detrimental or injurious pests will be destroyed, and wherein the box will be preserved.

A further object of my invention is to provide an improved box or fruit treating apparatus which is compact and wherein novel box moving members are provided which are arranged circumferentially.

Another object of the invention is to provide a box and fruit treating apparatus wherein a container is provided with rollers arranged spirally and in a fashion so that boxes may be moved therealong and wherein novel means is provided for treating the boxes while they are being moved.

Another object of the invention is to provide a box treating apparatus with novel means for moving a box.

A further object of the invention is to provide a box and fruit treating apparatus including novel means for injecting fluid material into and against the box while it is being advanced.

A further object of the invention is to provide a box treating apparatus including a container wherein novel means is provided for causing circulation therein.

Another object of the invention is to provide a box treating apparatus with novel means for providing and circulating fluid vapor therein.

A further object of the invention is to provide a box treating apparatus with novel means for supporting a guide roller.

Another object of the invention is to provide a box treating apparatus including novel means for causing the boxes to advance and to be moved laterally and vertically while they are being advanced.

An additional object of the invention is to provide a box treating apparatus including a central hollow member with means to drive a box around and against the member so the box will be moved laterally while it advances.

Another object of the invention is to provide novel means for spraying material into and against the box while it is being conveyed in a box treating apparatus.

Other objects and the advantages of my invention will be apparent from the following description taken in connection with the accompanying drawings, wherein:

Fig. 1 is a side elevation showing my improved fruit and box treating apparatus;

Fig. 2 is a top plan view of the apparatus;

Fig. 3 is a central section taken on line 3—3 of Fig. 2;

Fig. 4 is a horizontal section taken on line 4—4 of Fig. 1;

Fig. 5 is a horizontal section taken on line 5—5 of Fig. 1;

Fig. 6 is an enlarged fragmentary cross section taken on line 6—6 of Fig. 4 and showing one of the rollers and supporting means therefore in section;

Fig. 7 is an enlarged cross section taken on line 7—7 of Fig. 4 and showing my improved roller securing means;

Fig. 8 is an enlarged fragmentary cross section taken on line 8—8 of Fig. 7 showing my improved driving mechanism;

Fig. 9 is an enlarged fragmentary section taken on line 9—9 of Fig. 5 showing my improved heater and vapor generator;

Fig. 10 is an enlarged fragmentary elevation taken on line 10—10 of Fig. 4 showing my improved mechanism;

Fig. 11 is an enlarged sectional view of the insecticide pump;

Fig. 12 is an enlarged vertical section taken on line 12—12 of Fig. 5 showing my improved drain and overflow device; and Fig. 13 is an enlarged section taken on line 13—13 of Fig. 1 showing my improved conveyor gate.

Referring to the drawings by reference characters I have shown my invention as embodied in a box and fruit treating apparatus which is indicated generally at 10. As shown the apparatus includes a container 11 which is mounted on a support 12. The container is shown as cylindrical in shape although the shape may be varied to suit the particular requirements in each case.

The container 11 is provided with a bottom 13 and with a top 14 which has an aperture therein in which a conduit 15 is secured. This conduit 15 has a bottom closure 16 and has an elbow 17 at the top which communicates with the outlet from a blower indicated at 18. This blower 18 has an inlet 18' below which a baffle 18'' is mounted.

Mounted upon the top 14 I provide a motor 19 which is connected to drive the blower 18 and also a motor 20 which drives a sprocket 21 which in turn drives a chain 22 which passes over a sprocket 23 arranged upon a shaft 24. The shaft 24 has a pulley 25 secured thereon over which a V belt 26 passes. This V belt passes over a belt idler 26' and engages a plurality of pulleys 27, each of which is mounted on a shaft 28. The shafts 28 (see Fig. 7) pass through gear boxes 29 which latter have bearings 30 therein for the shaft. The drive shaft 24 also passes through a gear box similar to the gear boxes 29.

There are a number of these gear boxes distributed along each shaft and the number of gear boxes will depend upon the number of drive rollers and this will depend upon the particular construction and requirements in each case.

In each of the gear boxes the shafts 24 and 28 are provided with bevelled gears 31 which mesh with similar gears 32 mounted on shafts 33. These shafts 33 at one end pass through bearing bosses 34 and at the other end rest in V-shaped brackets 35 which are held in place by welding to the conduit 15. Each of the brackets 35 is provided with aligned apertures through which a cotter pin 35' is inserted to hold the shaft in position. The shafts 33 are helically arranged within the container.

Each of the shafts 33 is provided with a drive roll 36. As shown these drive rolls are angularly disposed with relation to the shaft so that an edge of the drive roll will engage a bottom or side of a box 37 and thus advance the box. The angular disposition of the drive roll also causes the box to move laterally from side to side as the position of engagement between the drive roll and the box shifts.

In the present construction I have shown my apparatus as adapted to receive a box at entrance A at the top thereof with the drive rolls so disposed and operated that the box travels downwardly and is discharged at the exit B at the lower end of the apparatus. It will be understood, however, that by reversing the direction of rotation of the drive rolls the box may be moved upwardly through the apparatus. The direction of movement of the box will depend upon the requirements and the particular installation.

Between the drive shafts 33 and drive rolls 36 I provide a plurality of conveyor rolls 38. As shown in Fig. 6 each of the rolls 38 is mounted on a shaft 39 which is supported at its outer end in a supporting member 40 and at its inner end is disposed in a bracket 41 and is held therein by a cotter pin 42. The brackets 41 and the cotter pins 42 are similar to the brackets 35 and cotter pins 35' previously described. The brackets 41 are held in place by welding them to the wall of the conduit.

The rolls 38 are arranged in helical form in the container and define a path of travel for the box which causes the box to pass a number of times around the conduit 15 and to be discharged at the exit B. Suitable conveyor members 43 and 44 as shown in Fig. 4 may be used to convey boxes to and from my apparatus. Rollers 45 convey boxes from the rollers 43 to the rollers 38 and rollers 46 convey boxes from the rollers 38 to the rollers 44.

In order to provide a closure for the container entrance and exit I employ a closure member which is shown in detail in Fig. 13. This closure member comprises a shaft 50 on which a plurality of flat metal strips or rods 51 are mounted. These strips hang free and have their upper ends looped around the shaft 50. An angle member 52 serves to limit the movement of the rods 51 in one direction.

Circulation is maintained throughout my apparatus with the fluid passing downwardly through the elbow 17 into the conduit 15 whence the fluid passes out through pipes 53, which project outwardly from the conduit 15.

Some of the pipes 53 are provided with nozzles 54. The pipes 53 are arranged at various positions in the container and certain of the nozzles 54, as shown in the drawing, are directed forwardly and downwardly, while others are directed rearwardly and downwardly with respect to the path of travel of the container. As a result, in one location the fluid will be directed into one part or corner of the box and will pass through all cracks therein and in another location the fluid will be directed toward another part or corner of the box. In this manner a complete treatment of the box is provided and a better distribution is secured than if all nozzles were directed into the box at one time.

Other of the pipes 53 are provided with upwardly directed slots 55 as shown in Fig. 6 while still other of the pipes 53 communicate with a chamber 56 disposed on the exterior surface of the container 11. Adjacent this chamber 56 the wall of the container is provided with an elongated slot 57 as shown in Fig. 3 so that fluid passing into the chamber 56 passes therefrom through the slot 57 and is directed against a box. The conduit 15 is also provided with one or more slots 58 in its wall as shown in Fig. 3 to direct fluid outwardly against the box.

The nozzles 54 and slots 55, 57, and 58 cause a general distribution of the fluid through all parts of the box which is being advanced. The fluid passes against the box under considerable pressure and thus enters all parts of the box, to thoroughly destroy any insects or other injurious material on the box. The nozzles 54 being in general downwardly directed and some of them being disposed above the drive rolls cause a downward pressure into the box, forcing it upon the drive roll so that there is no slippage when the box is being conveyed.

The fluid circulated through the container may be air and in order that this air may be heated I provide a container 59 having a burner 60 therein which is disposed in a compartment 59' arranged near the bottom of the container. (See Figs. 5 and 9). The burner 60 may be an oil burner and is shown as provided with a supply pipe 61 which is connected with a regulating valve 62 and with a shut-off valve 63 and is connected by a pipe 64 to a suitable source of fuel. The container 59 is provided with a draft opening 65. The compartment 59' has a top member 66 and when the burner is operating this top member 66 will be heated and air circulating over the heated surface 66 will be warmed. Instead of using warm air alone I may add water vapor to the air and to do this the top 66 of the container 59 is provided with a peripheral flange 67 providing a receptacle 68 for water. This receptacle includes a plurality of baffles 69 which are arranged to form a tortuous passage 69'. Water is supplied to the receptacle 68 from a supply line 70 and is controlled by a shut-off valve 71 and a regulating valve 72.

The regulating valve 72 is regulated so that the amount of water passing to the receptacle 68 is substantially equal to the amount vaporized. The water in the receptacle 68 changes into water vapor due to heat from the burner and passes into the air which is circulating in the container and then passes into and through the boxes as previously described.

Instead of, or in conjunction with, the burner 60 I may provide a steam coil 75 which is connected through a valve 76 with a steam supply line 77. The steam passes through the coil 75 and heats the water in the receptacle 68. Steam is discharged from the coil through a pipe 78. A valve 79 is arranged in the pipe 78 within the container 11 and this valve includes a nozzle 80 through which steam may be directed into the container 11 so that steam may be circulated in the container, should this be desired. The steam coil also has a branch 80' which discharges into the conduit 15. This branch 80' includes a control valve 80". Thus live steam may be directed into the conduit 15.

In order to supply oil, or other insecticide, or preserving material into the boxes, I provide a suitable spraying apparatus as shown in Fig. 10 wherein a lever 81 is pivoted intermediate its length as at 82 and this lever is normally held in a position where it will be engaged by a box passing over the rollers 38 and will be tripped.

The lever 81 is connected by a link 83 with an arm 84 which is pivoted as at 85. The arm 84 opposite the link 83 engages a rod 85' on a liquid injector which is indicated generally at 86 and which may be of standard design and includes a casing 87 having a diaphragm 88 therein which is connected to the rod 85'. The casing 87 includes an inlet 88' which is connected to a check valve 89 and the latter has a pipe 90 thereon which communicates with a fluid supply tank 91. The casing 87 also is connected to a check valve 92 which communicates with a pipe 93, the latter having an end portion 94 which projects into the container 11 through one of the pipes 53 (see Fig. 6) and has a suitable nozzle 94' on the inner end thereof.

From the foregoing description it will be apparent that when the lever 81 is rocked the diaphragm 88 will be moved downward to cause a charge of material in the container 91 to be drawn into the casing 87. When the lever 81 returns to normal position the diaphragm will be raised thus causing a charge of the material in the casing 87 to be discharged into a box.

The container 11, in the bottom 13 thereof, has an overflow and drain device indicated generally at 95. (See Fig. 12.) This device includes a fitting 96 which is connected to a standpipe 97. This standpipe 97 has a pipe 98 thereon which may communicate with a suitable drain. The pipe 98 includes a bushing 99 which is threaded to receive a tube 100. The tube 100 is provided with a handle member 101 which is made from a flat bar as shown in Fig. 5 so that it does not fill the tube 97. This member 101 has a grip 102 thereon. When the tube 100 is in place the flow through the fitting 96 rises around the tube 100 and if there is any overflow the discharge passes down the tube 100 into the waste pipe 98. If it is desired to drain the container 11 the tube 100 is removed and fluid passes from the fitting 96 into the standpipe 97 and through the pipe 98 to the drain.

In operating the device, the burner 60 is started and if water vapor is to be employed the valves 71 and 72 are properly adjusted, while if steam is to be employed, the steam valve 76 is operated. The motors 19 and 20 are supplied with current and as a result the shafts 33 are rotated and the blower 18 operated.

Boxes are placed on the conveyor 43 whence they pass through the entrance A onto the rollers 45 and then through the apparatus. In one location fluid is directed through the conduit 15 and is discharged towards one corner or portion of the box, while at other locations it is discharged towards other corners or portions. Meanwhile other fluid is being discharged through the slots 55, 57, and 58 towards other portions of the box and as a result of the repeated treatment at different locations, the fluid is forced into all of the cracks of the box and a thorough action is thus secured. This treatment insures that all portions of the box will be reached.

When the oil treatment apparatus is employed oil will be discharged through the nozzle 94' when the box passes over the operating lever 81. The boxes continue their travel until they pass onto the rollers 46 and out through the exit B along the conveyor 44.

It will thus be seen that with my apparatus very little space is required for a long distance of travel of the box and that throughout the long period of travel the box may be subjected to the action of fluid vapor or prolonged heat or both. When the box is treated while filled with oranges the treating fluid is forced between the oranges in the box to thoroughly treat them as well as the box. When treating both boxes and oranges I may use a fungicide such as a solution of boracic acid in the fluid in the container. This boracic acid or other fungicide may be discharged in the container from the injector 86.

From the foregoing description it will be apparent that I have provided a novel apparatus for treating boxes and fruit which can be economically manufactured and which is highly efficient in use.

Having thus described my invention I claim:

1. In an apparatus of the class described, an outer container, a central conduit in said container, a plurality of radially arranged rollers mounted on said conduit and said container, said rollers being arranged in helical form, said container having an entrance leading thereto and disposed near one end of the container, said container having an exit leading therefrom near the other end, means to convey a box through said container, and means to draw fluid from said container and to force the same through the conduit, said conduit having laterally directed outlet pipes thereon, said outlet pipes each having an outlet therein disposed within the container.

2. In an apparatus of the class described, an outer container, said container being disposed vertically, a hollow inner member disposed within said container, a spiral conveyor arranged between said container and member, said container having a pair of openings leading to said conveyor, said conveyor being adapted to convey boxes, means to circulate fluid through said hollow inner member and said container, said circulation means including discharge nozzles disposed at different elevations and directed towards a box on said conveyor.

3. In an apparatus of the class described, a container, a plurality of rollers mounted side by side in the container to provide a conveyor, a shaft directed across the container and disposed between a pair of said rollers, means to support said shaft, and a drive disk on said shaft, said disk projecting slightly above the top of the pair of rollers the axis of said drive disk being disposed at an angle to the axis of said shaft.

4. In an apparatus of the class described, a container, a plurality of rollers mounted side by side in the container to provide a conveyor, a bearing on said container, a shaft having one end disposed in said bearing and extending across the container, a bracket having an open top secured to the wall of said container and disposed between a pair of said rollers opposite said bearing, the other end of said shaft being disposed in the open top of said bracket, means to hold the shaft in the bracket and means on the shaft to advance a box on the rollers.

5. In an apparatus of the class described, a container, a plurality of rollers mounted side by side in the container to provide a conveyor, a gear box mounted on said container, a bearing boss on said gear box, a shaft having one end disposed in said bearing boss and extending across the container and disposed between a pair of said rollers, a V-shaped bracket secured to the wall of said container opposite said bearing boss, the other end of said shaft being disposed in said bracket, means to hold the shaft in the bracket, and a drive disk on said shaft, said disk projecting slightly above the top of the pair of rollers the axis of said drive disk being disposed at an angle to the axis of said shaft.

6. In an apparatus of the class described, an outer container, a conduit in said container, a plurality of radially arranged rollers mounted on said conduit and said container, said rollers being arranged in helical form, said container having an entrance leading thereto and disposed near one end of the container, said container having an exit leading therefrom near the other end, a plurality of shafts traversing the space between said conduit and said container, means to drive said shafts, each of said shafts having drive means thereon, said shafts being spaced apart a distance less than the length of a box which is adapted to be treated, said conduit having a closure at the lower end and means to draw fluid from said container and to force the same through the conduit, said conduit having laterally directed outlet pipes thereon, said outlet pipes each having an outlet therein disposed within the container.

7. In an apparatus of the class described, an outer cylindrical container, a central cylindrical conduit in said container and coaxial therewith, a plurality of radially arranged rollers mounted on said conduit and said container, said rollers being arranged in helical form, said container having an entrance leading thereto and disposed near one end of the container, said container having an exit leading therefrom near the other end, means for closing said entrance and said exit, a plurality of shafts traversing the space between said conduit and said container, means to drive said shafts in unison, each of said shafts having a drive member thereon, said drive members each comprising a circular disk, said shafts and said disks being spaced apart a distance less than the length of a box which is adapted to be treated, said conduit having a closure at the lower end and means to draw fluid from said container and to force the same through the conduit, said conduit having laterally directed outlet pipes thereon, said outlet pipes each having an outlet therein disposed within the container.

8. In a box treating apparatus, a container, a hollow inner member within the container, a substantially vertically helical conveyor, said conveyor being outside of said hollow member and in said container, said container having an entrance through which a box may be discharged onto the conveyor, said container having an exit through which a box may be discharged from the conveyor, means to circulate fluid through said hollow inner member and said container, and means to deliver fluid being circulated into a box on the conveyor.

9. In a box treating apparatus, a container, a substantially vertically arranged spiral conveyor disposed in said container, a hollow inner member in the container, said container having an entrance through which a box may be discharged onto the conveyor, said container having an exit through which a box may be discharged from the conveyor, means to circulate fluid through said hollow member and said container, and means in the container disposed above the bottom thereof to deliver fluid being circulated into a box on the conveyor.

10. In a box treating apparatus, a cylindrical housing closed at the top and bottom, said housing including an entrance portion adjacent the top thereof and an exit portion adjacent the bottom thereof, a hollow inner member in said housing extending from the top toward the bottom thereof, a blower member, means to drive said blower, said blower including an inlet conduit and an outlet conduit, said blower inlet and outlet conduits being disposed to cause circulation through said housing and said hollow inner member, a plurality of spaced conduit members extending outward from said hollow inner member, said conduit members including angularly disposed outlets adapted to discharge fluid into the space between said hollow inner member and the outer wall of said housing.

CHARLES B. COOK.